United States Patent [19]

Stinson

[11] Patent Number: 5,473,955
[45] Date of Patent: Dec. 12, 1995

[54] WIPER SYSTEM DOUBLE BALL JOINT

[75] Inventor: Andrew E. Stinson, Dearborn, Mich.

[73] Assignee: Ford Motor Company, Dearborn, Mich.

[21] Appl. No.: 223,411

[22] Filed: Apr. 4, 1994

[51] Int. Cl.⁶ ................................ B60S 1/24; F16C 11/06
[52] U.S. Cl. ................... 74/43; 403/56; 403/133; 15/250.27
[58] Field of Search ................... 403/53, 56, 133; 74/42, 43; 15/250.27, 250.31, 250.34; 296/96.15, 96.17

[56] References Cited

U.S. PATENT DOCUMENTS

| | | |
|---|---|---|
| 1,450,780 | 4/1923 | Olson . |
| 2,000,172 | 5/1935 | Hanson . |
| 2,073,957 | 3/1937 | Brouwer . |
| 3,749,431 | 7/1973 | Schmid et al. . |
| 4,009,502 | 3/1977 | Tamaki et al. ................... 15/250.27 |
| 4,938,526 | 7/1990 | Sannomiya et al. . |
| 5,062,655 | 11/1991 | Sommerer . |
| 5,176,044 | 1/1993 | Bauer et al. ................... 74/42 X |

FOREIGN PATENT DOCUMENTS

| | | | |
|---|---|---|---|
| 217804 | 5/1958 | Australia | .................. 403/56 |

Primary Examiner—Richard M. Lorence
Attorney, Agent, or Firm—Donald A. Wilkinson; Roger L. May

[57] ABSTRACT

A double ball joint assembly for use with a windshield wiper system. The double ball joint assembly includes a first ball affixed to a second ball such that a first drive link is retained between them. A first socket is coupled to the first ball and includes an annular groove for retaining a second drive link about its circumference. A second socket is coupled to the second ball and includes an annular groove for retaining a motor crank arm that is coupled to a wiper motor assembly. This double ball assembly produces a shorter overall double ball joint.

12 Claims, 2 Drawing Sheets

1

WIPER SYSTEM DOUBLE BALL JOINT

FIELD OF THE INVENTION

The present invention relates to mechanisms that drive wiper systems in a vehicle, and more particularly to double ball joints used in vehicle wiper drive systems.

BACKGROUND OF THE INVENTION

With an emphasis today on increasing vehicle fuel economy, cars and light trucks are being reduced in size where possible to help reduce the overall weight of the vehicle. In doing so, the space allowed for various systems in vehicles is also shrinking. This, in turn, requires that the various systems themselves must be reduced in size, typically by reducing the size of their individual parts within the various systems or by reconfiguring the assemblies of these systems to be more compact.

In the case of a drive mechanism for windshield wipers, this creates a desire to reduce the height of the traditionally "tall" double ball joint construction used for coupling a wiper motor crank lever to the two drive links in a drive-drive wiper system. This reduction in the overall size of the wiper system will thereby allow easier packaging of the wiper system into a vehicle as well as help to reduce weight.

An example of a "tall" double ball joint system is disclosed in U.S. Pat. 3,749,431 to Schmid. Schmid discloses a double ball joint design, but it is undesirably tall, thus requiring more space when mounted within the vehicle and increasing weight. Windshield wiper rods are mounted at the mid-point of each socket and a crank drive is mounted beyond the end of one of the sockets. Since the crank drive is on the end, it does not have the advantage of using a more compact connection arrangement to reduce the overall height of the double ball connector. Reducing the overall height allows for better packaging of the wiper system in the vehicle sheet metal, thus saving space and reducing weight.

SUMMARY OF THE INVENTION

In its embodiments, the present invention contemplates a double ball joint for use with a vehicle wiper system. The double ball joint comprises a double ball assembly including a first ball, a second ball and a means for securely connecting the first ball to the second ball. The first and second balls include a means that creates a junction for supporting a first drive link between the first and second balls. A first socket is coupled about the first ball and includes a means adapted for supporting a second drive link about the first socket. A second socket is coupled about the second ball and includes a means for supporting a motor crank arm about the second socket.

Accordingly, it is an object of the invention to provide an improved double ball joint construction for a wiper system that is reduced in overall height, and consequently reduced in weight.

It is an advantage of the present invention that the reduced height of the double ball joint, being more compact, will take up less space in the vehicle making for easier vehicle packaging.

BRIEF DESCRIPTIONS OF THE DRAWINGS

DETAILED DESCRIPTIONS OF THE PREFERRED EMBODIMENTS

Figure 1:
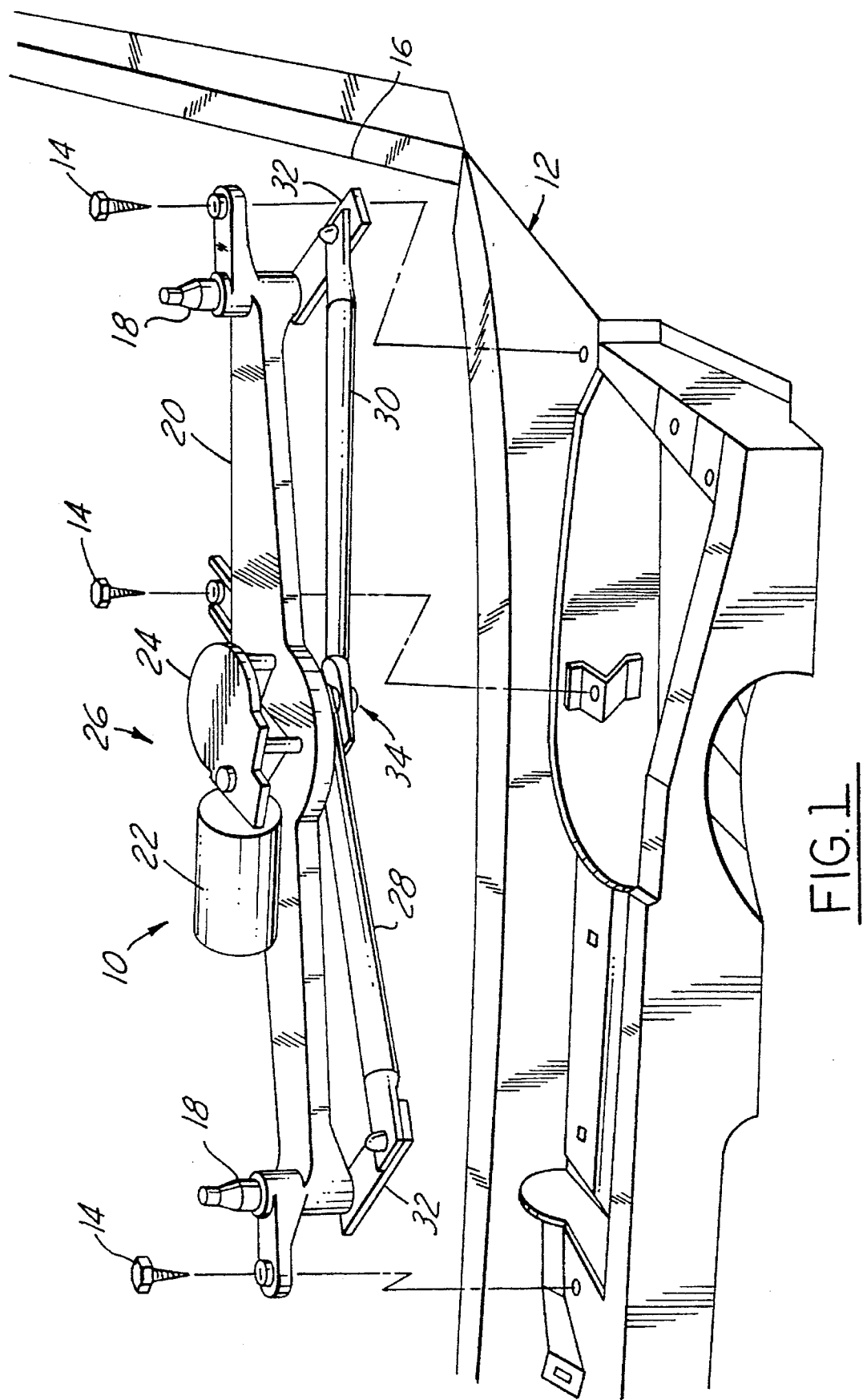
FIG. 1 is a partially exploded perspective view of an overall wiper assembly mounted in a vehicle.

FIG. 1 shows an overall wiper system assembly 10 mounted to a portion of a vehicle structure 12 just in front of the lower edge of a windshield 16 by mounting screws 14. Wiper assembly 10 includes a pair of wiper arm mounts 18 pivotally mounted to a wiper module 20. Wiper module 20 mounts and supports a wiper motor armature 22 and a wiper motor gear assembly 24, together forming wiper motor assembly 26.

A right hand tubular drive link 28 and a left hand tubular drive link 30 are rotatably attached at one end each of wiper arm mounts 18, via a pair of plates 32. The drive links are preferably made of metal, although they can also be made of plastic or other suitable material known to those skilled in the art. The other end of drive links 28 and 30 are coupled to a double ball joint assembly 34. The overall wiper system assembly 10 is a drive-drive wiper system since it has both links connected to a motor crank arm. This drive-drive wiper system weighs less and is shorter as opposed to a conventional slave drive wiper system in which only one of a pair of wiper drive links is directly driven by a motor. Wiper motor assembly 26 drives double ball joint assembly 34, which in turn, causes links 28 and 30 to activate wiper arm mounts 18, to which wiper arms (not shown) are coupled.

Figure 2:
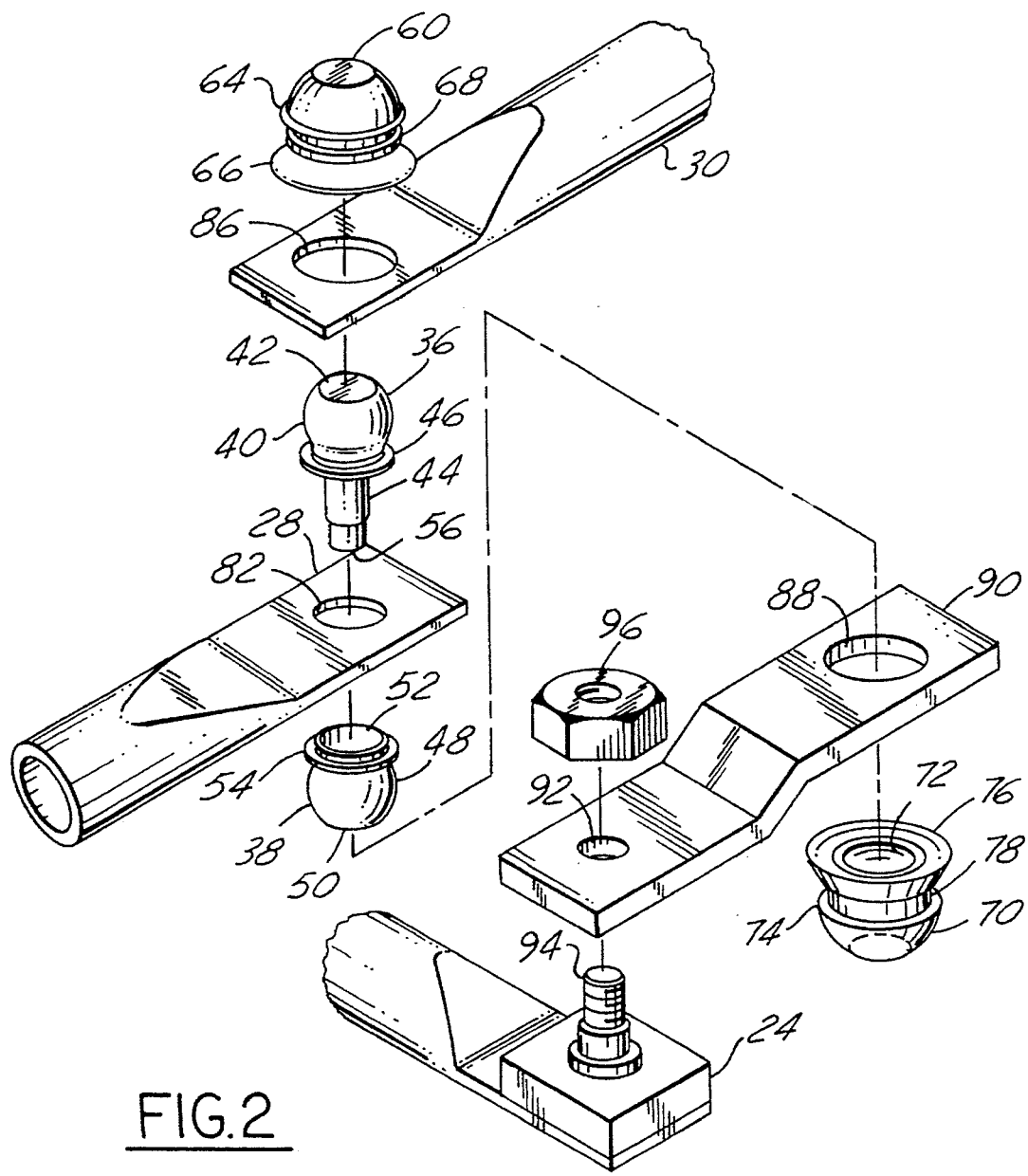
FIG. 2 is an exploded perspective view of a wiper double ball joint assembly.
Figure 3:
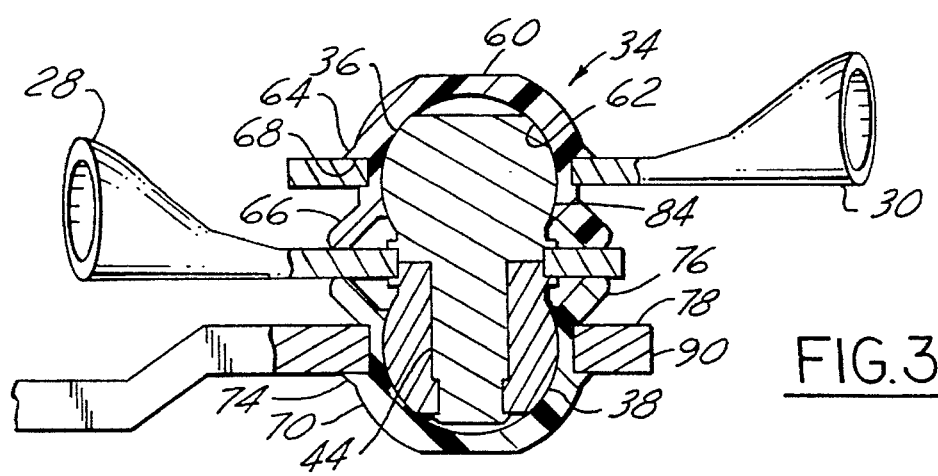
FIG. 3 is a cross-sectional view of a wiper double ball joint assembly.

Double ball joint assembly 34 is shown in more detail in FIGS. 2 and 3. It includes a first ball 36 and a second ball 38, preferably made of metal, although they could also be made of plastic. First ball 36 includes a spherical portion 40 having a flat side 42 and a cylindrical pin 44 protruding from spherical portion 40 opposite flat side 42. A circular support ring 46 is concentric with pin 44 and adjacent to spherical portion 40.

Second ball 38 includes a spherical portion 48 having a flat side 50. It also includes a cylindrical bore 52 through its center and concentric with flat side 50. A circular support ring 54 is concentric with bore 52 and opposite flat side 50.

A first socket 60, preferably made of plastic, includes an internal spherical cavity 62 and has first and second circumferentially oriented support rings, 64 and 66 respectively, located externally about socket 60. Adjacent to first support ring 64 is an annular groove 68. A second socket 70 is substantially identical to first socket 60. It includes an internal spherical cavity 72 and has first and second circumferentially oriented support rings, 74 and 76 respectively, located externally about socket 70. Adjacent to first support ring 74 is an annular groove 78.

Double ball joint assembly 34 fits together by sliding pin 44 of first ball 36 through a hole 82 in right hand drive link 28 and into bore 52 in second ball 38. The end 56 of pin 44 protrudes through the end of bore 52 and is flattened firmly against flat side 50 of second ball 38; that is, the two balls are radially riveted together. The mushroomed pin 44 will now hold the two balls together and prevent them from rotating relative to one another. This forms double ball assembly 84. There is sufficient clearance between hole 82 in right hand drive link 28 and balls 36 and 38 to allow relative rotation between right hand drive link 28 and the junction formed between first and second balls 36 and 38. In lieu of using a mushroomed pin, other methods could also be used to insure that the two balls are secured relative to one another, or the double balls could be formed integrally with right hand drive link 28 including a different mechanism for coupling to the double ball assembly between the two balls.

First socket 60 is snapped into a hole 86 in left hand drive link 30 until hole 86 passes over first support ring 64 and engages within annular groove 68. First support ring 64 will ensure that left hand drive link 30 is retained on first socket 60. Second socket 70 is snapped into a hole 88 in a motor crank lever 90 until hole 88 passes over first support ring 74 and engages within annular groove 78.

Annular grooves 68 and 78 are oriented on sockets 60 and 70, respectively, such that when the sockets are assembled with the balls, grooves 68 and 78 align approximately midway along balls 36 and 38, respectively. Wiper module 20 is secured in vehicle structure 12 and the right hand and left hand drive links are affixed to module 20. Then, double ball joint assembly 34 fits together by snapping first and second sockets 60 and 70 respectively over their respective balls 36 and 38.

A second hole 92 in motor crank arm 90 is now slipped over a threaded shaft 94 protruding from wiper motor gear assembly 24. A nut 96 secures motor crank lever arm 90 to threaded shaft 94.

Double ball joint assembly 34 for automobile windshield wiper assembly 10 now provides a reduction in overall assembly height, thereby reducing weight and the size of space it takes up in vehicle structure 12.

While certain embodiments of the present invention have been described in detail, those familiar with the art to which this invention relates will recognize various alternative designs and embodiments for practicing the invention as defined by the following claims.

I claim:

1. A double ball joint assembly and drive links for use in a vehicle wiper system comprising:
   a double ball member including a first and a second ball portion;
   a first drive link;
   means for coupling the first drive link approximately midway between the first and second ball portions;
   a second drive link;
   a first socket having an internal cavity that receives and retains the first ball portion and means for receiving and retaining the second drive link;
   a motor crank arm; and
   a second socket having an internal cavity that receives and retains the second ball portion and means for receiving and retaining the motor crank arm.

2. A double ball joint assembly according to claim 1 wherein the means for receiving and retaining the second drive link comprises an external groove about the first socket circumference that engages a hole provided in the second drive link, and the means for receiving and retaining the motor crank arm comprises an external groove about the second socket circumference that engages a hole provided in the motor crank arm.

3. A double ball joint assembly according to claim 2 wherein the first socket further includes a support ring adjacent to the external groove about the first socket, and the second socket further includes a support ring adjacent to the external groove about the second socket.

4. A double ball joint assembly according to claims 3 wherein the double ball member is formed from separate balls, where the first ball portion and the second ball portion are joined together after fabrication, and wherein the means for coupling the first drive link includes a pair of retaining rings, one each affixed to one of the ball portions.

5. A double ball joint assembly according to claim 1 wherein the double ball member is formed from separate balls, where the first ball portion and the second ball portion are joined together after fabrication, and wherein the means for coupling the first drive link includes a pair of retaining rings, one each affixed to one of the ball portions.

6. A double ball joint assembly according to claim 1 wherein the first socket and the second socket each have a second support ring affixed thereto such that the second support rings are in contact with the first drive link.

7. A double ball joint assembly according to claim 1 wherein the external grooves about the first and second sockets are each located about midway along each respective socket.

8. A wiper system for a motor vehicle comprising:
   a first drive link having a first and a second end;
   a second drive link having a first and a second end;
   a wiper support module adapted to be mounted to the motor vehicle and coupled to the first ends of the first and second drive links;
   a wiper motor mounted to the wiper support module;
   a double ball member including a first and second ball portion;
   means for coupling the second end of the first drive link approximately midway between the first and second ball portions;
   a first socket having an internal cavity that receives and retains the first ball portion and means for receiving and retaining the second end of the second drive link;
   a motor crank arm having a first and a second end; and
   a second socket having an internal cavity that receives and retains the second ball portion and means for receiving and retaining the second end of the motor crank arm, where the first end of the motor crank arm is coupled to the wiper motor.

9. A wiper system according to claim 8 wherein the means for receiving and retaining the second end of the second drive link comprises an external groove about the first socket circumference that engages a hole provided near the second end of the second drive link, and the means for receiving and retaining the second end of the motor crank arm comprises an external groove about the second socket circumference that engages a hole provided in the second end of the motor crank arm.

10. A wiper system according to claim 9 wherein the first socket further includes a support ring adjacent to the external groove about the first socket, and the second socket further includes a support ring adjacent to the external groove about the second socket.

11. A wiper system according to claim 10 wherein the double ball member is formed from separate balls, where the first ball portion and the second ball portion are joined together after fabrication, and wherein the means for coupling the second end of the first drive link includes a pair of retaining rings, one each affixed to one of the ball portions.

12. A wiper system according to claim 8 wherein the first socket and the second socket each have a second support ring affixed thereto such that the second support rings are in contact with the first drive link.

\* \* \* \* \*